Feb. 6, 1945. P. C. SANDRETTO ET AL 2,368,618
AIRCRAFT ANTENNA
Filed April 15, 1942 3 Sheets-Sheet 1
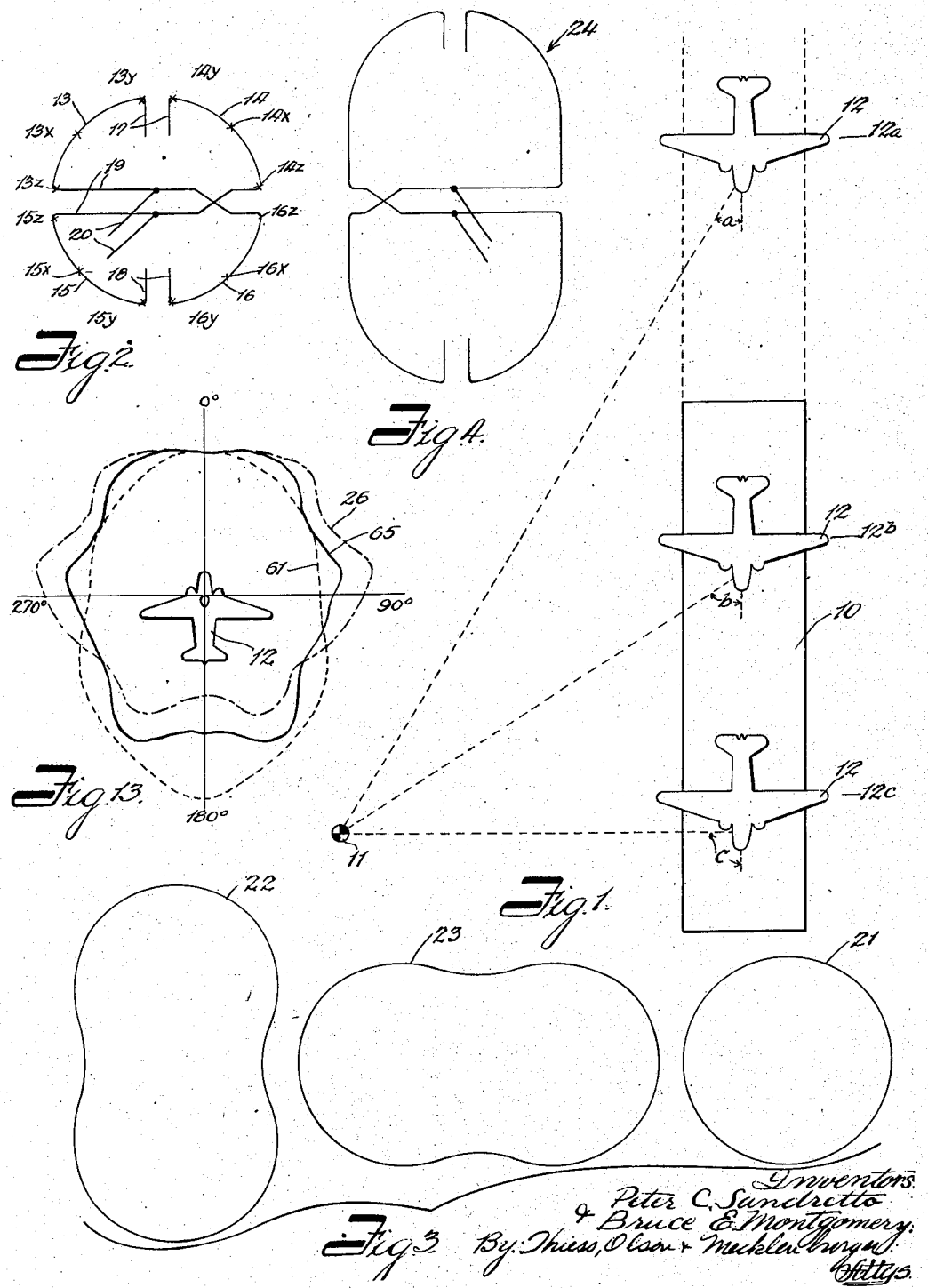

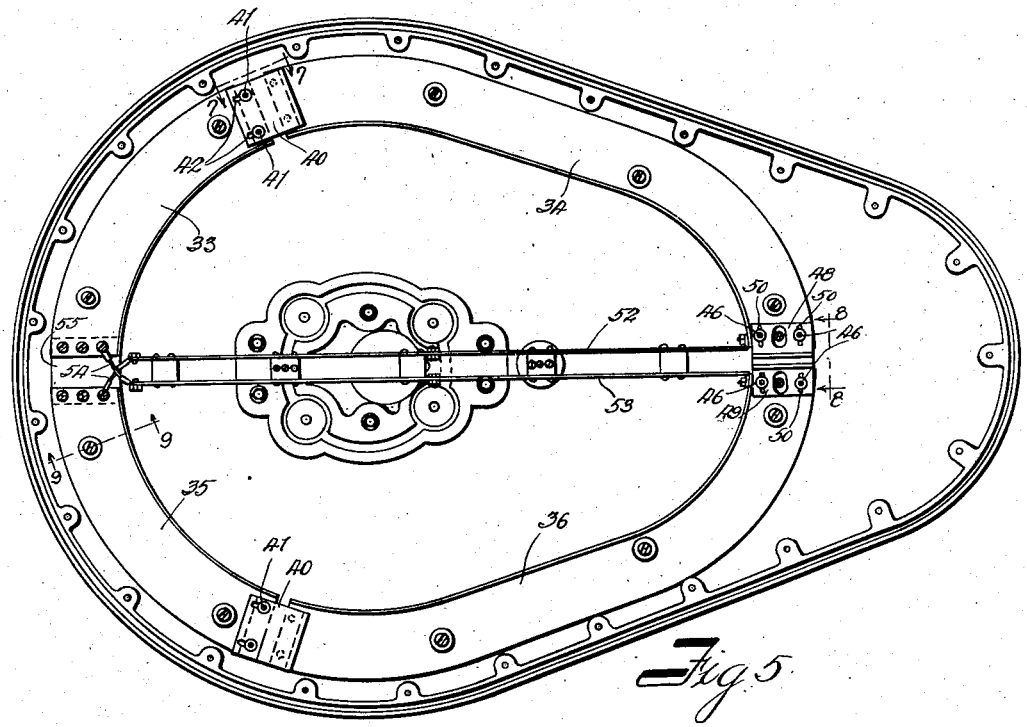
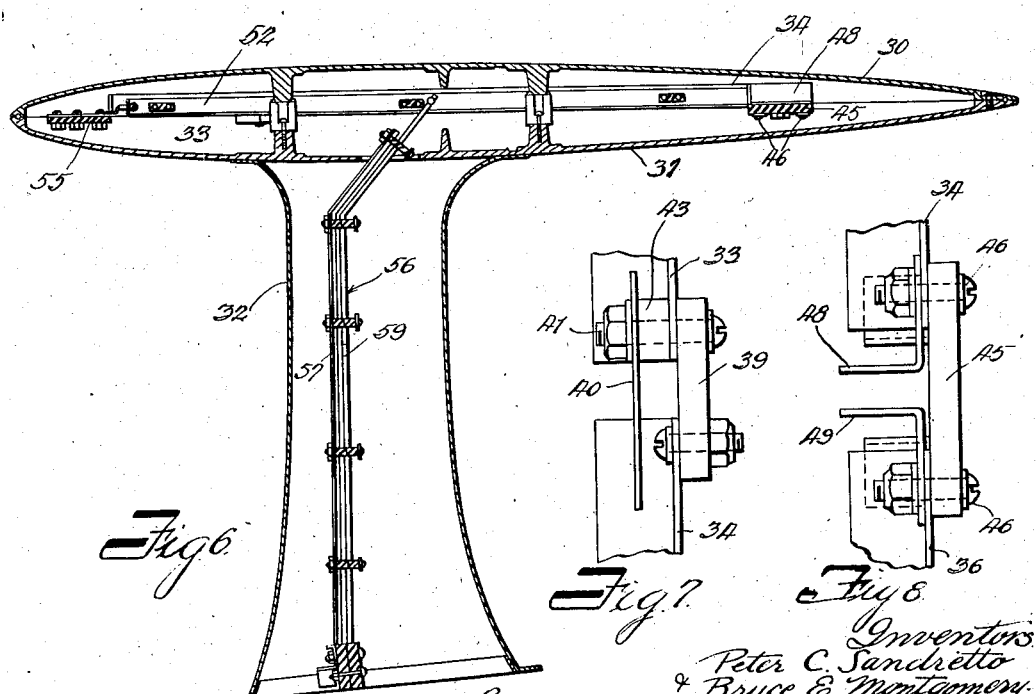

Feb. 6, 1945. P. C. SANDRETTO ET AL 2,368,618
AIRCRAFT ANTENNA
Filed April 15, 1942 3 Sheets-Sheet 3
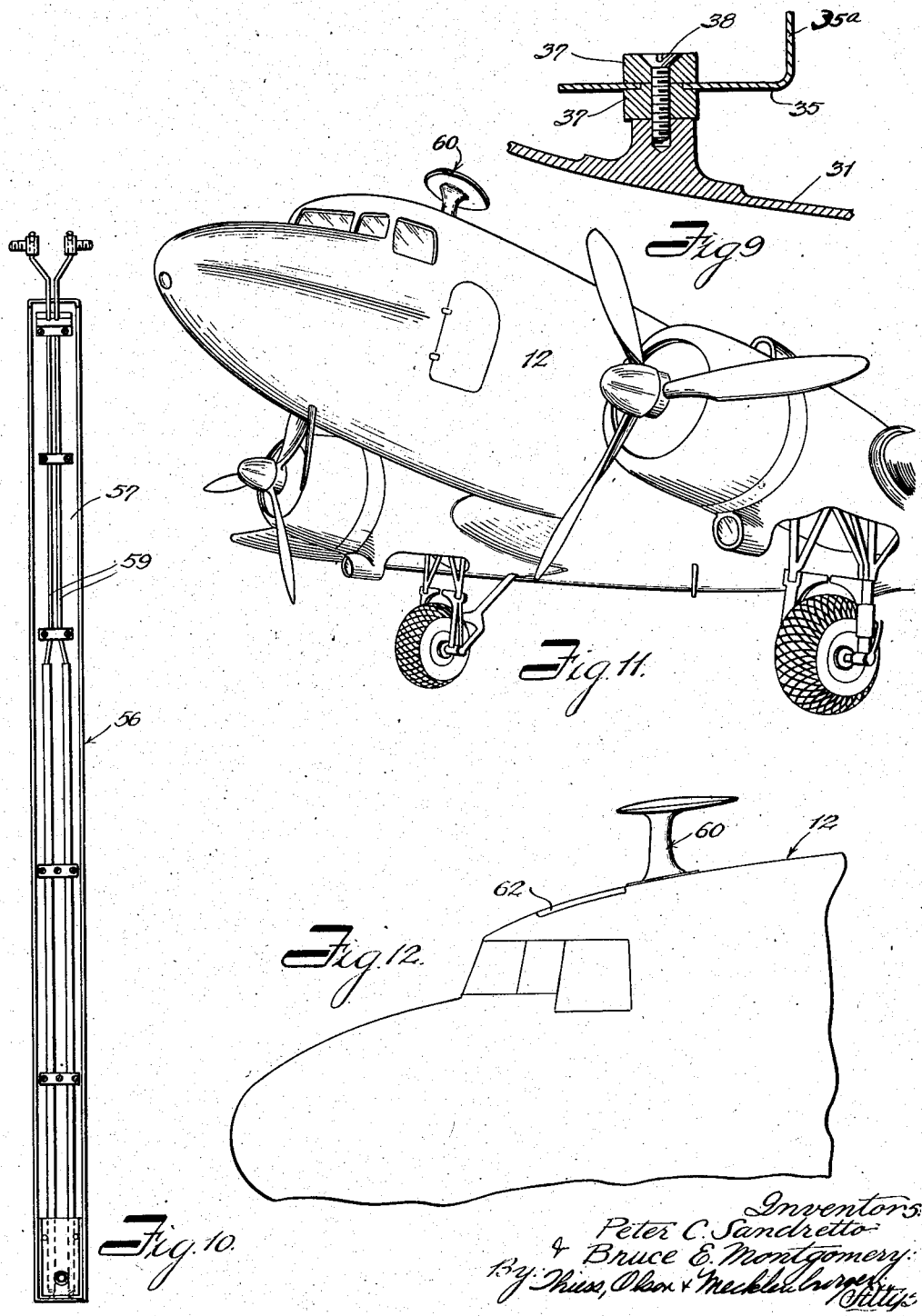

Patented Feb. 6, 1945

2,368,618

UNITED STATES PATENT OFFICE 2,368,618

AIRCRAFT ANTENNA

Peter C. Sandretto, Chicago, and Bruce E. Montgomery, Berwyn, Ill., assignors to United Air Lines, Inc., a corporation of Delaware Application April 15, 1942, Serial No. 439,034

4 Claims. (Cl. 250—33)

This invention relates to antenna structures, more particularly to aircraft antennas adapted for the reception of ultra-high-frequency radio signals, and the invention has for an object the provision of an antenna of this character for use in systems employing plane polarized electromagnetic waves.

While the particular embodiment of the invention described herein is intended for the reception of horizontally polarized electromagnetic waves from an aircraft radio range or beacon, the invention is not limited thereto but may also be employed in antenna structures for systems utilizing vertically polarized waves. Antenna structures have heretofore been proposed wherein a loop type antenna is provided for use with ultra high frequencies on the order of magnitude of 100 megacycles, which loop is responsive only to horizontally polarized waves and embodies broad band characteristics. Such antenna structures, however, have not been found entirely satisfactory for aircraft mounting because of the distortion of the antenna field pattern which is effected by the aircraft structure itself. For purposes of easy reference, the distortion effect produced by the aircraft structure will be referred to herein as the free space field pattern of the aircraft, and this field pattern, while not directly measureable, may be readily derived by dividing out the free space pattern of the antenna from the resultant pattern of the aircraft-mounted antenna.

It is the usual practice, particularly in the commercial operation of aircraft, to supply guidance and directive control to the aircraft by means of radio stations which are located on the ground and which have certain directive characteristics. As the aircraft moves from place to place, it receives from these ground stations, signals of varying characteristics or intensities, and the pilot of the aircraft is thus able to determine from the signal characteristic or intensity the position of his airplane. It will of course be appreciated that, if the receiving antenna on the aircraft also has a directional characteristic, the received signals will change in accordance with the heading of the aircraft even though the position of the aircraft does not change. It is, therefore, of extreme importance that the receiving antenna on the aircraft be substantially nondirectional in order that the received signal will truly indicate the position of the aircraft.

Particular instances wherein the provision of nondirectional receiving antennas is of primary importance are found in instrument landing systems operating at ultra-high frequencies wherein suitable marker beams are employed, and the glide path utilized for guiding the aircraft to its landing comprises a uniform intensity path and in radio range beacons operating at similar frequencies. It is a further object of this invention to provide an ultra-high-frequency antenna of the above character having substantially nondirectional characteristics when mounted on an aircraft or similar nonuniform conducting surface.

In carrying out the invention in one form, the free space field pattern of the aircraft itself, due to the metallic structure of the aircraft, is determined at the frequencies involved, and the antenna to be mounted on the aircraft is constructed so as to provide a free space field pattern therefor which is distorted from a substantially circular nondirectional pattern in accordance with the predetermined pattern of the aircraft. The thus constructed antenna is mounted on the aircraft in a position such that it will be capable of receiving, with a minimum of interference, a signal originating from a ground station, and in a position such that the respective free space patterns of the aircraft and the antenna combine to produce a resultant antenna pattern that is substantially nondirectional.

In constructing the antenna in the preferred form of the invention, a plurality of loop sections which constitute the radiating or receiving elements, preferably in the form of strip conductors having an electrical length less than one-quarter wave length, are fixedly mounted in end-to-end relation to form a loop which is shaped so that, when uniform current distribution exists in the loop sections, a partially distorted field pattern results and loading means are arranged to couple the spaced ends of the loop sections, the loading means being adjusted to vary the current distribution so as further to distort the field pattern. Thus a suitably distorted field pattern may be obtained which, when combined with the field pattern of the aircraft by properly mounting the antenna thereon, produces a resultant pattern which provides a substantially uniform response or field intensity in all critical directions.

For a more complete understanding of this invention, reference should now be had to the drawings, in which:

Fig. 1 is a somewhat diagrammatic illustration of an instrument landing system to which the present invention is particularly applicable;

Fig. 2 is a diagrammatic representation of a loop antenna of the general type to which the present invention relates;

Fig. 3 is a diagram showing various antenna field patterns which may be obtained in accordance with the principles of this invention by varying the current distribution in the antenna structure;

Fig. 4 is a diagrammatic representation of an antenna structure similar to the antenna shown in Fig. 2 but physically distorted so as to provide a desired distortion of the field pattern thereof;

Fig. 5 is a top plan view of an antenna structure adapted to be mounted on an aircraft, which antenna structure is now believed to represent a preferred embodiment of the present invention, the upper half of the antenna housing being removed more clearly to illustrate the antenna structure;

Fig. 6 is an elevational sectional view taken substantially along the major axis of the antenna illustrated in Fig. 5;

Fig. 7 is a fragmentary detail view taken along the line 7—7 of Fig. 5;

Fig. 8 is a similar view taken substantially along the line 8—8 of Fig. 5;

Fig. 9 is a fragmentary sectional view taken substantially along the line 9—9 of Fig. 5;

Fig. 10 is a detail view of the transmission line which extends through the supporting mast for the antenna as shown in Fig. 6;

Fig. 11 is a partial view of a well known type of transport aircraft with the antenna of Figs. 5 and 6 mounted thereon;

Fig. 12 is a fragmentary side view of the aircraft and antenna shown in Fig. 11; and Fig. 13 is a field strength diagram illustrating the general character of the distorted free space field pattern produced by the antenna of Figs. 5 and 6, the distorting field pattern of the aircraft, and the resultant substantially constant response pattern obtained with the antenna mounted on the aircraft, the field in the direction of a head-on signal being taken as unity in each case in order to facilitate comparison of the respective field patterns.

Referring first to Figs. 1 to 4, inclusive, of the drawings, which serve to illustrate the fundamental principles involved in the practice of the present invention, there is shown in Fig. 1 an instrument landing system wherein an aircraft is adapted to be guided to its landing on a runway 10 by means of glide path signals transmitted from a ground radio station 11 located at a considerable distance to one side of the runway. As will be understood by those skilled in the art, such a location of the transmitting station is, in most cases, necessary in order to provide for proper control of the constant potential glide path.

If it is assumed that the approaching aircraft 12, the various positions of which are indicated by the reference numerals 12a, 12b, and 12c, is provided with a known type of antenna having a substantially nondirectional pattern, and that the aircraft itself has a distorting field pattern of the general configuration indicated by the dot and dash line 26 of Fig. 13, the resultant field pattern of the antenna when mounted on the aircraft 12 will be of the same general configuration as is illustrated by the line 26, the resultant being equal to the product of the field pattern 26 and the constant radius pattern of the nondirectional antenna. It will thus be apparent that a signal coming directly head-on toward the aircraft will be received at a much lower intensity than a signal received at an angle of approximately 80° from the heading of the aircraft or a signal received at right angles to the heading. Furthermore, reception of a signal coming directly toward the tail will be received with a very small intensity as compared to a head-on signal, and this is particularly objectionable in radio range reception.

As shown in Fig. 1, the aircraft, when occupying the position 12a at which it first picks up the glide path signals, will receive the signals at an angle a, which angle will gradually change as the airplane proceeds to the position 12b until the signals are being received at an angle b, the angle continuing to increase until at position 12c the angle of reception is equal to the angle c. With the above indicated resultant field pattern, the reception at any substantial angle to the heading of the aircraft is of course greater than the head-on reception, and consequently, as the aircraft moves from the position 12a to position 12b, the intensity of the signal increases even though the plane is following the constant potential glide path. The pilot at the position 12b would thus receive a "too high" signal that would lead him to believe that his aircraft was flying above the constant potential glide path, and consequently he would immediately increase the angle of glide or otherwise manipulate the controls to permit the airplane to drop down. At the position 12c a much greater "too high" signal would be received, and because of the erroneous impression thus imparted to the pilot, satisfactory landings of aircraft, having receiving antennas of the character indicated, have heretofore been difficult of accomplishment if not substantially impossible.

In accordance with the principles of this invention, however, the antenna structure is so designed and is so correlated with the aircraft as to provide a final resultant field pattern which has substantially nondirectional characteristics and which will receive a constant intensity signal with substantially constant intensity, regardless of the direction of the transmitting station relative to the aircraft. In order to accomplish this result, the field pattern of the antenna itself is so predistorted that it will, when subjected to the distortion effected by the irregular metallic structure of the aircraft, produce a field pattern which approaches a substantially circular shape. Two factors which are employed to control the predistortion of the antenna field pattern in accordance with this invention are the current distribution in the radiating or receiving elements of the antenna and the physical shape of the antenna loop.

In Fig. 2 there is shown somewhat diagrammatically an antenna structure of the general type to which this invention is applicable, which antenna comprises a plurality of loop sections 13, 14, 15, and 16 disposed in substantially end-to-end relation with the adjacent ends of the sections 13 and 14 and the sections 15 and 16, respectively, terminating in sections 17 and 18 which constitute loading means for the loop formed by the radiating or receiving loop sections. Although these loading means are shown as constituting transmission lines, they may of course be replaced by condensers or other suitable loading means. As shown in Fig. 2, the adjacent ends of the sections 13 and 15 and the sections 14 and 16 are connected by a transposed tie line 19 from which the connection to the receiver is made by means of a suitable transmission line 20. As will be hereinafter explained in connection with the preferred physical embodiment of this invention, a suitable capacitance may also be coupled between the adjacent ends of the loop sections 14 and 16 for the purposes of broad band reception thereby to insure proper reception of various ultra-high frequencies within the band employed in radio range beacons.

In Fig. 2 the loop sections 13 to 16, inclusive, are shown as being shaped to provide a substantially circular loop, and it has been found that, by properly adjusting the lengths of the transmission lines 17 and 18, the current distribution in the loop sections may be so varied that the points of maximum current will lie approximately at the midpoints 13x to 16x, inclusive, and a field pattern will be obtained which is substantially circular, as indicated by the reference numeral 21 in Fig. 3. If the length of the transmission line sections 17 and 18 is sufficiently increased, the points of maximum current may be shifted to approximately the points 13y to 16y, inclusive, and a field pattern substantially as indicated by the reference numeral 22 in Fig. 3 will be obtained. By shortening the transmission line elements 17 and 18, the points of maximum current may be reversely shifted to approximately the points 13z to 16z, inclusive, which will result in a field pattern substantially as indicated by the reference numeral 23 in Fig. 3. Thus, by controlling the loading of the loop sections so as to vary the current distribution therein, the resulting field pattern may be adjusted as desired between the extreme configurations illustrated by the numerals 22 and 23 in Fig. 3.

While in some cases the desired distorted field pattern may be obtained merely by varying the loading of the antenna loop sections, definite limitations on the amount of variation of the loading that is permissible are imposed by the desirability of maintaining the broad band characteristics of the antenna. Consequently, in accordance with the principles of this invention, further predistortion of the antenna pattern, beyond the permissible predistortion obtained by the loading, is obtained by varying the shape of the loop from a circular configuration. Attempts to obtain all of the desired predistortion simply by physical distortion of a uniformly loaded loop, would involve difficulties in cases where a large predistortion is necessary due to the fact that the area of the loop having a fixed perimeter would thus be reduced so as to decrease the loop efficiency.

In Fig. 4 there is shown, for example, an antenna structure 24 which is electrically similar to the antenna structure illustrated in Fig. 2 but which is modified to provide an elongated physical shape which will in itself cause distortion of the field pattern, and it will be found that, if a current distribution similar to that indicated by the points 13x to 16x in Fig. 2 is employed in the antenna 24 of Fig. 4, a resultant field pattern similar to that indicated by the reference numeral 22 in Fig. 3 will be obtained.

Referring now to the preferred physical embodiment of the invention illustrated in Figs. 5 to 10, inclusive, the antenna is shown as mounted in a housing of non-conducting material comprising an upper portion 30, a complementary lower portion 31, and a supporting mast or post 32 the lower end of which is adapted to be secured to a surface of the aircraft and the upper end of which is suitably secured to the housing portion 31. The housing formed by the housing portions 30 and 31 is designed to provide a pleasing and attractive appearance, and is preferably of a modified airfoil shape, substantially as shown in Figs. 5 and 6.

The loop antenna, which is enclosed within the housing, comprises a plurality of loop sections 33, 34, 35, and 36 which, in order to provide low characteristic impedance, are preferably in the form of strip type conductors. These conductors are of an electrical length less than one-quarter wave length at the frequencies at which the antenna is designed to operate and are shaped, as shown, so that when mounted in spaced-apart end-to-end relation they constitute a loop structure. As shown best in Fig. 9, each of the loop sections 33 to 35, inclusive, is provided at its inner edge with an upstanding flanged portion, such as 35a, so that the sections are substantially L-shaped, and each of the loop sections is rigidly secured to the lower housing portion 31 by suitable spacer elements 37 and screws 38. The provision of strip type flanged conductors, such as the L-shaped cross section shown, for forming the loop sections of the antenna, results in a low impedance structure having great rigidity and a maximum area relative to the available space within the housing.

Although maximum utilization of the space would require that the sections 34 and 36 be so shaped as substantially to follow the configuration of the housing, such a configuration does not readily yield the desired distortion of the field pattern, and accordingly the shape illustrated in Fig. 5 is employed.

As shown best in Figs. 5 and 7, the respective left-hand ends of the loop sections 34 and 36, as viewed in Fig. 5, are disposed in spaced relation to the respective right-hand ends of the sections 33 and 35, and in order to insure proper current distibution in the loop sections and proper loading of the antenna structure, capacitative coupling means are provided between these adjacent ends. Inasmuch as the coupling means employed at these two points, as shown in the drawings, are identical, only the coupling means between the sections 33 and 34, as shown in detail in Fig. 7, will be described.

Referring to Fig. 7, the ends of the sections 33 and 34 are rigidly secured together by an insulating plate 39, and a conducting plate 40 is adjustably secured by suitable screws 41 and a conducting spacer 43 to the section 33 in spaced relation to the section 34. As shown, the conducting plate 40 is provided with elongated slots 42 (Fig. 5) for receiving the screws 41, and the conducting spacer 43 serves to connect the conducting plate 40 to the section 33 with the free end of the plate 40 extending in overlapping relation with the section 34 in order to provide a condenser. In order to adjust the loading of the antenna, it is necessary only to adjust the position of the conducting plate 40 so as to vary the degree of overlapping between this plate and the loop section 34.

The adjacent ends of the sections 34 and 36, as shown best in Fig. 8, are connected by an insulating spacer 45 which is rigidly secured by suitable screws 46 to the respective ends of the sections 34 and 36, and the capacitative loading and coupling means at this point comprises a pair of substantially L-shaped conductor plates 48 and 49 which engage the section 34 and 36 in conductive relation and which are disposed in spaced relation to each other. Each of the plates 48 and 49 is provided with elongated slots 50 (Fig. 5) through which the screws 46 extend and which permit adjustment of the plates 48 and 49 toward and away from each other to vary the coupling between the sections 34 and 36 and thus the loading of the antenna. Preferably, the capacity of the various loading and coupling means is so proportioned as to impart to the antenna structure a broad band characteristic, and the permissible adjustment of these loading means for the purpose of predistorting the field pattern of the antenna is preferably maintained within such limits as not to affect these broad band characteristics.

Connection of the antenna structure to the radio translating apparatus is accomplished by means of a transposed tie line, which is illustrated in Figs. 5 and 6 as comprising a pair of strip type conductors 52 and 53, the right-hand end of the conductor 52 being connected as shown to the flange on the loop section 34 and the corresponding end of the conductor 53 being connected to the flange on the loop section 36. At their opposite ends the conductors 52 and 53 are connected, by suitably crossed flexible conductors 54, to the spaced-apart adjacent ends of the loop sections 35 and 33 respectively, which sections are rigidly secured to a suitable insulating spacer 55. Intermediate its ends, at a point so determined as to maintain the broad band characteristics of the antenna structure, in accordance with previously known principles, the transposed tie line comprising the conductors 52 and 53 is connected to a suitable transmission line 56 which extends through a suitable aperture in the lower housing member 31 and downwardly through the hollow mast 32. As shown best in Fig. 10, this transmission line 56 includes a shielding member 57 having mounted thereon, and secured thereto by suitable insulators, a pair of spaced conductors 59. Adjacent their upper ends the conductors are closely spaced in order to provide an impedance transforming section enabling the low impedance antenna to be connected to the radio receiver without excessive mismatch over the broad band of frequencies for which the antenna is designed to operate.

In the field strength diagrams of Fig. 13, the broken line pattern 61 represents a distorted free space pattern which may be obtained with an antenna of the type shown in Figs. 5 and 6. It will be observed that this free space pattern does not follow either the physical configuration of the antenna loop or any of the illustrative patterns shown in Fig. 3 for certain loadings of circular antennas, but instead the pattern 61 is a distorted pattern which is the resultant of the antenna shape and the antenna loading.

As heretofore indicated, the proper location of the antenna structure on the aircraft, so as to combine in the desired manner the predistorted free space pattern of the antenna and the distorting free space pattern of the aircraft, constitutes an important feature of this invention, and in Figs. 11 and 12 the antenna structure of Figs. 5 and 6 is identified by the reference numeral 60 and is shown mounted on an aircraft 12 which is of a well known type. Inasmuch as modern aircraft structures are to a large extent standardized, it is necessary in the practice of this invention to compromise theoretical considerations as to the location of the antenna with the established aircraft design practice.

The particular transport aircraft 12 shown in Figs. 11 and 12 is a two-motor airplane of the low wing type having a silhouette such as is diagrammatically indicated in Figs. 1 and 13. Although the antenna 60 is particularly intended for use on the type of aircraft herein illustrated, it has been found that the antenna may be applied with only slight if any modification to various types of low wing aircraft, inasmuch as under the dictates of modern design all aircraft of this type have a generally similar silhouette and result in a generally similar distorting field pattern. Thus is has been found that the antenna of Figs. 5 and 6 operates satisfactorily on other specific designs of low wing two-motor aircraft, and also upon similar four-motor aircraft.

In locating the antenna on the aircraft, various factors must be taken into account. In the first place, it is essential that the antenna be located substantially on the longitudinal axis of symmetry of the aircraft, as otherwise the antenna structure must be designed for distortion of the field pattern with respect to both horizontal axes which would necessarily increase the cost and difficulties of design. While the antenna may be mounted either on an upper or a lower surface of the aircraft, it has been found desirable in most cases to mount the antenna on the upper surface. This is due to the fact that instrument landing systems, for which the antenna is particularly designed, require that the antenna be positioned at the maximum possible height. Where the antenna is intended only for localizer systems, it may of course be mounted on the undersurface of the aircraft.

Mounting the antenna on the upper surface of the aircraft gives rise to certain difficulties, as will be apparent upon inspection of Figs. 11 and 12. One factor which must be considered is the shielding effect which may be encountered due to the nose structure of the airplane, and it is consequently desirable to mount the antenna structure as far forward as possible in order to avoid the effect commonly known as "nose shadow." While from the theoretical standpoint "nose shadow" could best be avoided by mounting the antenna on the forward portion of the nose of the airplane, such a location would not be satisfactory since it would materially obscure the pilot's view. Consequently the antenna is mounted on the top of the pilot's cabin as indicated in the drawings. A further compromise, however, must be made due to the fact that in substantially all conventional aircraft the pilot's escape hatch is located in the forward portion of the cabin top, and consequently the most advantageous point of mounting remaining for the antenna is, as illustrated in Fig. 12, directly behind the escape hatch 62, the height of the antenna mast being sufficient to support the antenna loop in a position such that the "nose shadow" effect will be eliminated or substantially minimized.

In a specific physical embodiment of the invention, the antenna shown in Figs. 5 and 6 was constructed by forming the loop sections 33, 34, 35, and 36 from an aluminum-alloy having an electrical conductivity substantially equal to that of aluminum, the strips forming the loop sections being .051" in thickness and 2" in width, with an upstanding flange ⅝" in height. These loop sections were so spaced as to provide 1/16" spaces between the sections 33 and 34 and the sections 35 and 36, and to provide 1" spaces between the sections 33 and 35 and the sections 34 and 36. The sections 33 and 35 were each arcuately formed on an outer radius of 9⅞" to subtend an angle of 70° measured from centerline to centerline of the spaces above referred to. The sections 34 and 36 were formed with arcuate right-hand end portions having an outer radius of 7¾" about a center spaced 6¹⁵⁄₁₆" to the right of the center of curvature of the sections 33 and 35. Thus the overall dimensions of the loop constituting this physical embodiment of the invention were approximately 33¹⁵⁄₁₆" along the major dimension of the loop, and approximately 19¾" along the maximum transverse dimension.

The condenser plates 40 were formed of material similar to the loop sections and of the same thickness and were 1⅞" in width and 1¾" in length. The spacers 43 were located flush with the end edges of the sections 33 and 35 and were approximately ¼" in thickness, the plates 40 being mounted thereon with the free ends of the plates extending approximately 1⅛" beyond the spacers 43 in overlapping relation with the sections 34 and 36. In this same physical embodiment of the invention the condenser plates 48 and 49 were provided with upstanding portions ⅝" in height, and were adjusted to provide a gap therebetween of approximately ¹¹⁄₁₆" extending equally on each side of the centerline of the loop.

As previously indicated, the free space pattern of an antenna of the type shown in Figs. 5 and 6 is identified by the reference numeral 61 in Fig. 13. Such an antenna when mounted in the position above described on an airplane of the type such as is shown in Figs. 11 and 12, which airplane produces a distorting pattern substantially of the character indicated by the dot and dash line 26 in Fig. 13, will produce a substantially nondirectional field pattern such as is represented by the heavy line 65 in Fig. 13. It will be observed that the resultant field pattern represented by the line 65 in Fig. 13 approaches a circular shape more closely than does the field pattern 26, which, as above indicated, represents either the free space pattern of the aircraft itself or the resultant field pattern of a non-directional antenna mounted on the aircraft. In the two upper quadrants the maximum points in the pattern 26, which occur approximately 33⅓° and 80° on each side of the head-on position, are considerably reduced in the pattern 65. This of course is of critical importance in instrument landing systems.

Likewise, the minimum points, which occur in the two lower quadrants of the pattern 26 in the direction of the tail of the aircraft, have been so compensated for in the pattern 65 that the pattern directly at the tail position will be substantially unity, thus to achieve substantially uniform reception of radio range signals whether the aircraft is flying directly toward or directly away from a ground transmitting station. Experiments carried out with antenna structures embodying this invention establish that the variations from a true circle, which are indicated in the pattern 65, fall well within permissible operating limits, and thus from an operating standpoint the resultant pattern may be considered a substantially uniform response pattern or a nondirectional pattern. Measurements taken during such experiments indicate that the greatest variation occurring in either a maximum or minimum direction with antennas embodying the principles of the invention as above explained is on the order of 1½ to 2 decibels. Thus, by the principles herein discussed and in accordance with this invention, an aircraft-mounted antenna having broad band characteristics is obtained which is capable of receiving horizontally polarized, ultra-high-frequency electromagnetic waves and which has a substantially nondirectional field pattern.

Although the loop sections 33, 34, 35, and 36 in the preferred embodiment shown are illustrated as being fixedly mounted and the various loading means are shown as being adjustable in order to vary the electrical relation of the antenna loop sections, it may be desirable in some cases to mount some or all of the loop sections for relative movement and to provide loading means of fixed value, in which case the final adjustment of the electrical relation of the loop elements and consequently the desired predistortion of the field pattern may be obtained by adjusting the relatively movable loop sections.

While a particular embodiment of this invention has been shown, it will be understood, of course, that the invention is not limited thereto since many modifications may be made, and it is, therefore, contemplated by the appended claims to cover any such modifications as fall within the true spirit and scope of the invention.

Having thus described our invention, what we claim and desire to secure by Letters Patent is:

1. An ultra-high-frequency antenna comprising a plurality of flanged strip type conductors forming loop sections, said conductors having an electrical length less than one-quarter wave length, insulating means rigidly connecting said conductor sections in spaced apart end-to-end relation to form a loop, said loop having a physical shape to provide a field pattern distorted from a nondirectional pattern, means including conducting plates mounted in spaced relation to some of said ends for capacitatively coupling and for loading said sections, means for adjustably positioning said plates to vary the current distribution in said sections and further distort the field pattern of said antenna, and means including a transposed tie line extending along an axis of symmetry of said loop and a transmission line connected thereto for connecting said loop to a translating device.

2. An ultra-high-frequency antenna comprising a plurality of loop sections, means rigidly mounting said sections with the ends of each section in predetermined spaced relation to the ends of adjacent sections thereby to form a loop, said loop having a physical shape to provide a field pattern distorted from a nondirectional pattern, loading means coupling at least some of said ends comprising a conducting plate connected to one section and capacitatively associated with the spaced end of an adjacent section, and means for adjustably mounting said plate for longitudinal movement relative to said sections to vary the current distribution in said sections and further vary the field pattern of said antenna, and means for connecting said loop to ultra-high-frequency translating means.

3. An antenna structure adapted to be mounted on a nonuniform conducting surface, comprising a plurality of loop sections, means mounting said sections with the ends of each section in predetermined spaced relation to the ends of adjacent sections to form a loop, said loop having a physical shape to provide a free space field pattern distorted from a nondirectional pattern partially to compensate for the distorting effect of said nonuniform surface, loading means coupling said spaced ends and providing a broad band characteristic for said loop, means for adjusting said loading means to vary the current distribution in said sections and distort the distorted free space field pattern provided by the shape of said antenna thereby to compensate further for said distorting effect of said surface and provide a final substantially nondirectional pattern, said adjusting means being limited to a range of adjustment wherein said broad band characteristic is maintained, and means for connecting said loop to a translating device.

4. An ultra high frequency broad band antenna for an aircraft, comprising a plurality of loop sections having an electrical length less than a quarter wave, means rigidly mounting said sections in end-to-end relationship to form a loop, adjacent ends of said sections being spaced apart, said loop having a physical shape to provide a free space field pattern distorted from a nondirectional pattern to compensate partially for the distorting effect of the aircraft, loading means coupling said spaced ends, means including a transposed tie line extending along an axis of symmetry of said loop and a transmission line connected thereto for connecting said loop to a translating device, said last-mentioned means and said loading means providing a broad band antenna characteristic, and means for adjusting said loading means to vary the current distribution in said sections and distort the distorted free space pattern provided by the shape of said antenna thereby to compensate further for said distorting effect of said aircraft and provide a final substantially nondirectional pattern, said adjusting means being limited to a range of adjustment wherein said broad band characteristic is maintained.

PETER C. SANDRETTO.
BRUCE E. MONTGOMERY.